(12) United States Patent
Trentadue

(10) Patent No.: US 7,108,010 B2
(45) Date of Patent: Sep. 19, 2006

(54) CHECK VALVE POSITION DETECTOR

(75) Inventor: Fred Trentadue, Olathe, KS (US)

(73) Assignee: Smith & Loveless, Inc., Lenexa, KS (US)

( * ) Notice: Subject to any disclaimer, the term of this patent is extended or adjusted under 35 U.S.C. 154(b) by 371 days.

(21) Appl. No.: 10/670,732

(22) Filed: Sep. 26, 2003

(65) Prior Publication Data

US 2005/0067026 A1   Mar. 31, 2005

(51) Int. Cl.
*F16K 37/00* (2006.01)
*F16K 15/03* (2006.01)

(52) U.S. Cl. .................... 137/554; 137/527.8

(58) Field of Classification Search ............. 137/552, 137/554, 527.8; 417/44.2, 44.5, 63; 340/610; 200/81.9 HG, 61.52; 73/861.75, 861.76
See application file for complete search history.

(56) References Cited

U.S. PATENT DOCUMENTS

| | | | | |
|---|---|---|---|---|
| 1,905,146 A | * | 4/1933 | Chapin | 200/81.9 R |
| 2,057,904 A | * | 10/1936 | Morse | 137/527.8 |
| 2,981,195 A | * | 4/1961 | Payne, II et al. | 200/81.9 HG |
| 2,985,731 A | * | 5/1961 | Taylor | 200/81.9 HG |
| 3,230,971 A | * | 1/1966 | Rosaen | 137/527 |
| 3,519,369 A | | 7/1970 | Weiss | |
| 3,525,353 A | | 8/1970 | Parks | |
| 3,558,012 A | | 1/1971 | Weiss | |
| 3,875,963 A | * | 4/1975 | Buck et al. | 137/527.8 |
| 4,353,390 A | * | 10/1982 | Karpenko | 137/527.8 |
| 5,035,583 A | | 7/1991 | Vaught | |
| 5,063,775 A | * | 11/1991 | Walker et al. | 73/861.75 |
| 5,305,787 A | * | 4/1994 | Thygesen | 137/554 |
| 6,164,324 A | * | 12/2000 | Gradle | 137/554 |

* cited by examiner

*Primary Examiner*—John Rivell
(74) *Attorney, Agent, or Firm*—Wood, Phillips, Katz, Clark & Mortimer

(57) ABSTRACT

A position detector for a check valve, including a bracket with a support arm, adjustable securing members adapted to rigidly secure the bracket to a check valve arm, a tilt switch, a connector, a circuit status indicator, a wire connector for both the tilt switch and the circuit status indicator, and a first plug. The connector adjustably connects the tilt switch to the bracket support arm in a selected one of a plurality of secure positions pivoted around an axis fixed to the bracket support arm, the axis being oriented generally horizontally when the securing members secure the bracket to the check valve arm. The first plug is selectively securable to the wire connector whereby a first circuit with the tilt switch and the circuit status indicator is formed when the tilt switch is in a selected position.

16 Claims, 3 Drawing Sheets

CHECK VALVE POSITION DETECTOR

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward check valves, and particularly toward check valve position detectors.

BACKGROUND OF THE INVENTION AND TECHNICAL PROBLEMS POSED BY THE PRIOR ART

Check valves may be used, for example, to prevent back flow through a conduit. When flow in the desired direction occurs through the conduit, the check valve will automatically be opened by the pressure of the flow. Where such flow is provided by a pump, such a check valve will normally always be open during proper operation of the pump.

In some applications, therefore, check valves having check valve arms or handles are used. Such check valve arms are disposed outside the conduit but are mechanically connected to the associated valve, whereby the position of the valve inside the conduit can be manually controlled when desired by manipulating the handle. Further, the position of the valve can be visually determined based on the position of the check valve arm.

Of course, visual inspection of valves is not adequate in many situations, as they may not be in conveniently seen locations, and will typically operate round the clock whereby constant operator supervision would be impractical and/or impossible. Therefore, limit switches have heretofore been used to detect pump failure by detecting whether or not a check valve is closed when the pump is supposed to be operating. However, limit switches are expensive, and are difficult to install and adjust.

Mercury switches have also been used to detect pump failure based on detection of a closed check valve when the pump is supposed to be operating. However, such switches have required clear tube switches in order to be able to see whether the switch is making contact in the proper valve position. This requires that the tubes be exposed so that they can be seen, which also makes them particularly susceptible to breakage. Further, even where the switch appears to an observer to be making contact, it can be difficult to determine visually whether or not such contact is steady. To overcome this, or where the switch has not been adequately visible, cumbersome additional equipment, such as meters or test lights, have been used to ensure proper positioning of the switch relative to the check valve arm.

The present invention is directed toward overcoming one or more of the problems set forth above.

SUMMARY OF THE INVENTION

In one aspect of the present invention, a position detector for a check valve is provided, where the valve includes a check valve arm pivotable in response to a change in position of the check valve. The detector includes a bracket with a connector adjustably connecting a tilt switch in a selected pivotal position around an axis oriented transverse to the bracket legs. The bracket includes a long leg connected at its lower end to a parallel small leg by a bottom leg, and a support arm extends from the upper end of the long leg with a portion facing the bottom leg, whereby the check valve arm is receivable between the support arm and the bottom leg and between the long leg and the short leg. Set members on one of the short leg and long leg and one of the bottom leg and the support arm are adjustably movable toward the other. The detector also includes a wire connector for both the tilt switch and a circuit status indicator, and a first plug is selectively securable to the wire connector to form a first circuit with the tilt switch and the circuit status indicator when the tilt switch is in a selected position.

In one form of this aspect of the invention, the first plug includes a power source for the circuit. In a further form, the power source is a battery.

In another form of this aspect of the invention, a second plug is selectively securable to the wire connector to form a second circuit with the tilt switch and a controller, wherein the controller operates responsive to the condition of the tilt switch.

In a further form of this aspect of the invention, the circuit status indicator is a light emitting diode, and in a still further form, the light emitting diode is integral with the tilt switch.

In another aspect of the present invention, a position detector for a check valve is provided, including a bracket with a support arm, adjustable securing members adapted to rigidly secure the bracket to the check valve arm, a tilt switch, a connector, a circuit status indicator, a wire connector for both the tilt switch and the circuit status indicator, and a first plug. The connector adjustably connects the tilt switch to the bracket support arm in a selected one of a plurality of secure positions pivoted around an axis fixed to the bracket support arm, the axis being oriented generally horizontally when the securing members secure the bracket to the check valve arm. The first plug is selectively securable to the wire connector whereby a first circuit with the tilt switch and the circuit status indicator is formed when the tilt switch is in a selected position.

In one form of this aspect of the invention, a second plug is selectively securable to the wire connector to form a second circuit with the tilt switch and a controller, wherein the controller operates responsive to the condition of the tilt switch. In a still further form, the tilt switch closes the second circuit when the check valve arm is in a position corresponding to the check valve being closed, the controller controls a pump adapted to pump through the valve, and the controller activates a pump operation alarm when operating the pump if the second circuit closes.

In another form of this aspect of the invention, the bracket has a long leg generally parallel to a small leg, where the long and small legs are interconnected at their lower ends by a bottom leg, and the support arm extends from the upper end of the long leg, is spaced from the small leg and includes a portion facing the bottom leg, where the check valve arm is receivable between the support arm and the bottom leg and between the long leg and the short leg.

In a still further form of this aspect of the invention, the securing members include a first set member on one of the short leg and long leg and a second set member on one of the bottom leg and the support arm. The first set member is adjustably movable toward the other of the short leg and long leg, and the second set member is adjustably movable toward the other of the bottom leg and support arm.

In yet another form of this aspect of the invention, the first plug includes a power source for the circuit. In a further form, the power source is a battery.

In still another form of this aspect of the invention, the circuit status indicator is a light emitting diode, and in a still further form the light emitting diode is integral with the tilt switch.

In another aspect of the present invention, a method of securing a position detector to a check valve arm pivotable responsive to a change in position of a check valve of a pump is provided, including the steps of (a) securing a support bracket to the check valve arm, the support bracket supporting a tilt switch pivotable about a generally horizontal axis relative to the support bracket, (b) providing a powered circuit through the tilt switch and a position indicator associated with the tilt switch, (c) pivoting the tilt switch while the check valve arm is in a closed position until the position indicator is activated by the powered circuit, (d) securing the tilt switch against pivoting relative to the support bracket, and (e) providing a monitoring circuit through the tilt switch and a controller controlling the pump.

DETAILED DESCRIPTION OF THE INVENTION

Figure 1:
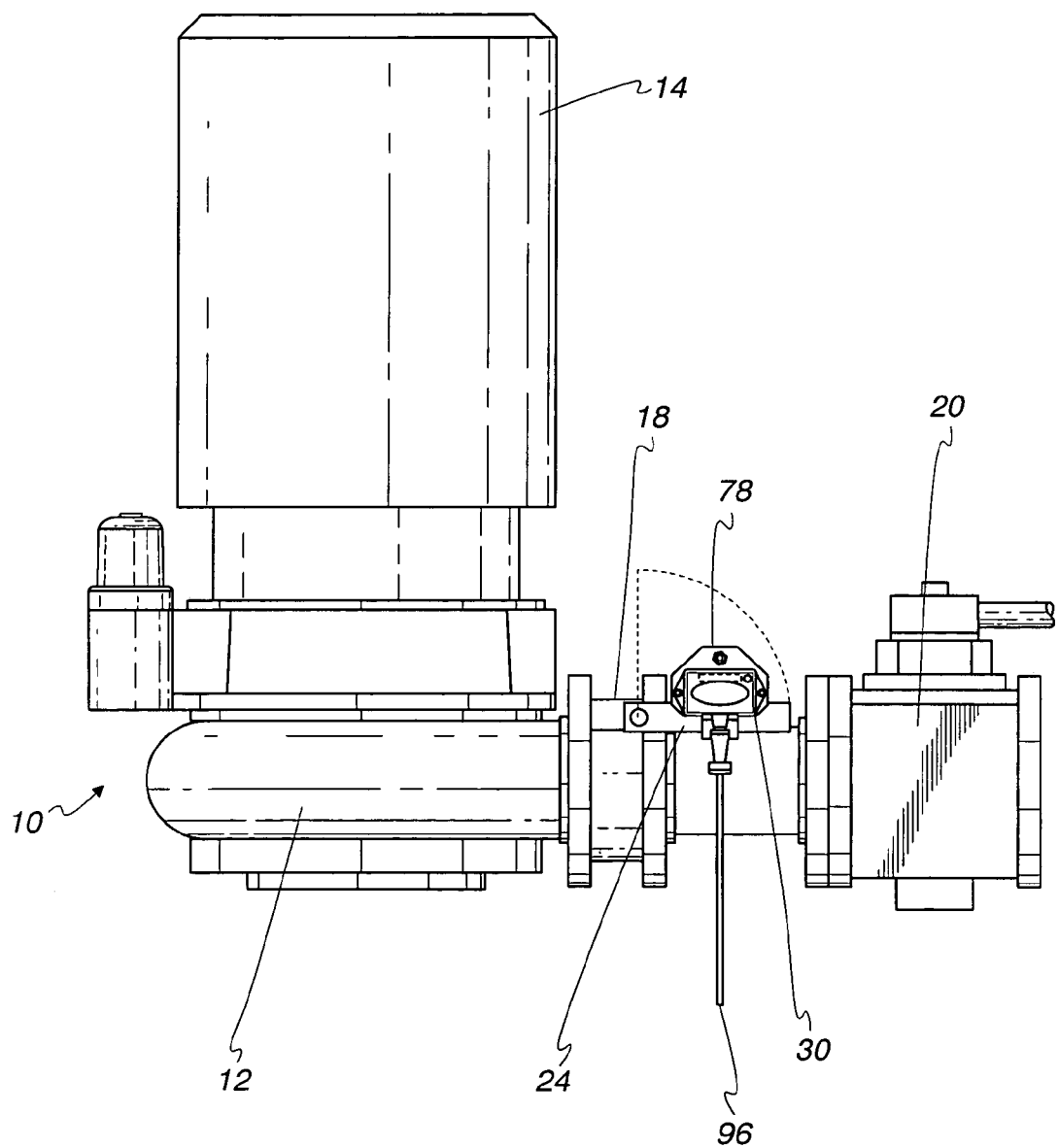
FIG. 1 is a side view of an example pump application incorporating the present invention.

An exemplary application of a pump station 10 with which the present invention may be used is illustrated in FIG. 1 with an embodiment of the present invention. In the illustrated application, a suitable pump 12 is driven by a suitable motor 14 to propel the applicable fluid (such as water or wastewater) through a check valve 18 and, for example, a plug valve 20. The check valve 18 includes a check valve arm or handle 24 which is pivotably connected to the check valve 18 whereby the check valve arm 24 will pivot responsive to a change in condition of the valve 18 (e.g., between open and closed conditions).

As illustrated in FIG. 1, the check valve arm 24 is in a substantially horizontal position with the check valve 18 in a closed position. The valve 18 may be manually opened by counterclockwise pivoting of the check valve arm 24. Moreover, when the pump 12 is operating properly and is pumping fluid through the check valve 18 so as to force it open, the check valve arm 24 will be similarly pivoted automatically due to the force of the pumped fluid.

Suitable conduit, including additional valves (not shown), may be connected to the plug valve 20 to carry the pumped fluid as desired to locations outside the pumping station 10 such as is well known.

Figure 2:
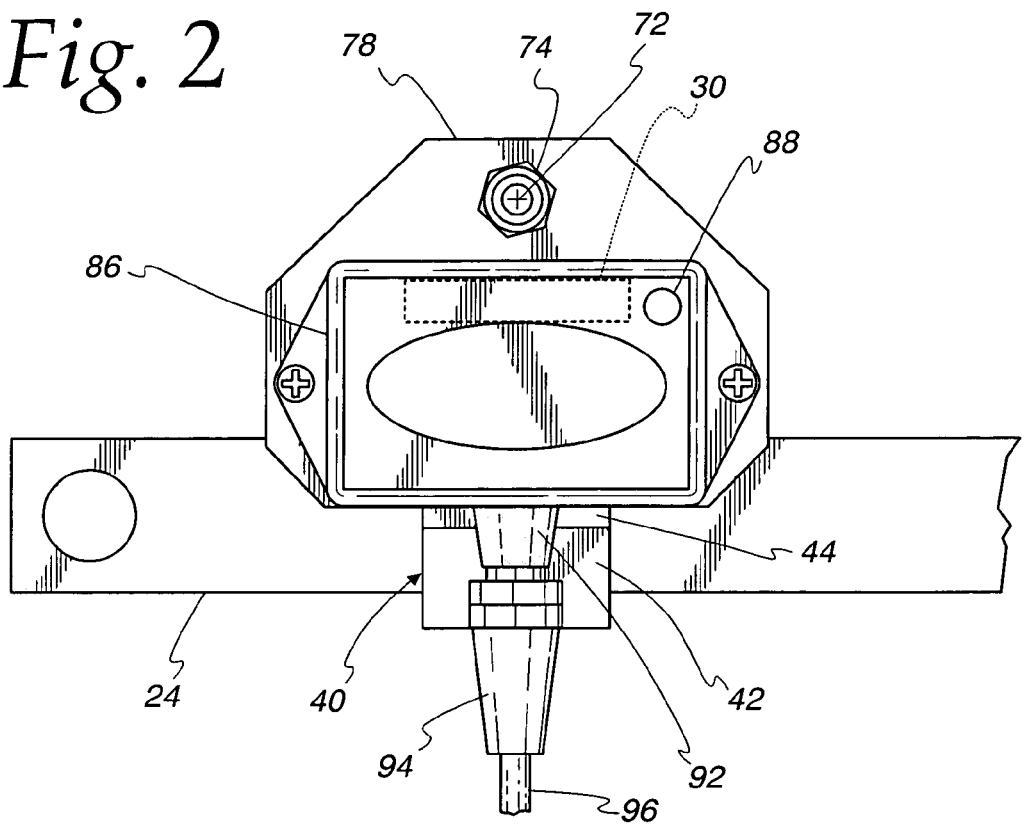
FIG. 2 is a front view of a tilt switch as incorporated in the present invention.
Figure 3:
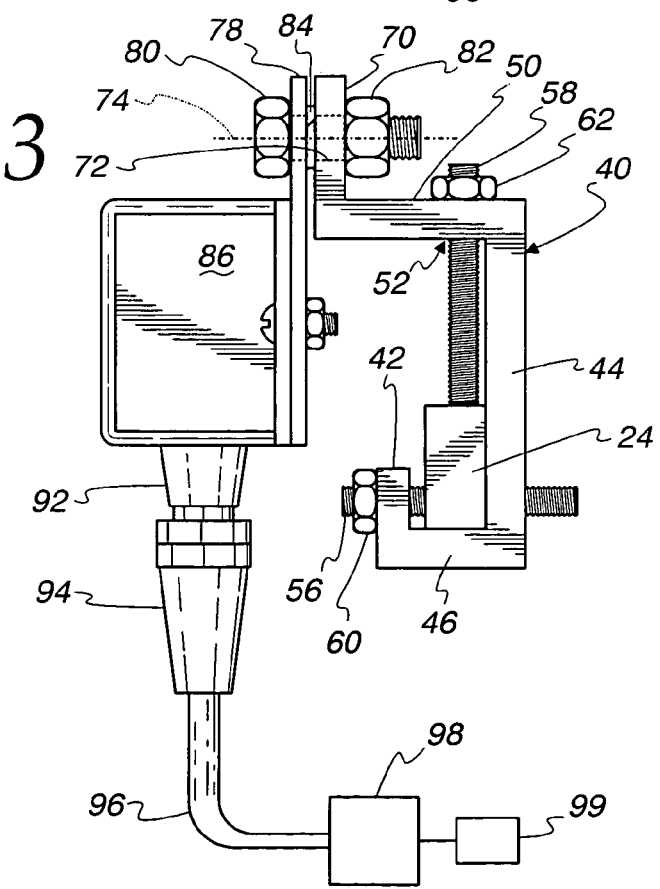
FIG. 3 is a side view of the tilt switch of FIG. 2.
Figure 4:
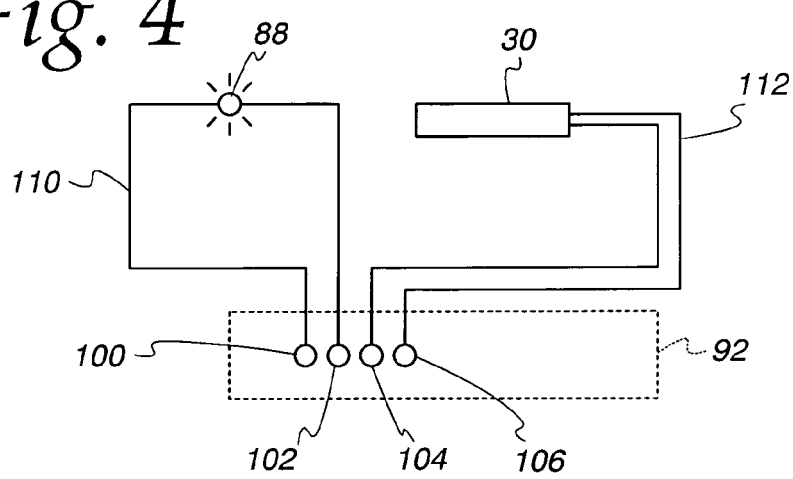
FIG. 4 is circuit diagram of a wire connector for a tilt switch usable with the present invention.

A suitable tilt switch 30 is secured to the check valve arm 24, as better illustrated in FIGS. 2–3.

Specifically, a mounting bracket 40 is suitably secured to the check valve arm 24 as best seen in FIG. 3. The advantageous illustrated bracket 40 includes a short leg 42 and a long leg 44 connected on their bottom ends by a bottom leg 46, whereby the three legs 42, 44, 46 are in a generally "J" configuration. The bottom leg 46 is sufficiently long to space the short and long legs 42, 44 apart a sufficient distance so that the check valve arm 24 will fit between them with some room to spare.

A support arm 50 is connected to the upper end of the long leg 44 and extends therefrom in the same direction as the bottom leg 46 so that a portion 52 of the support arm 50 faces the bottom leg 46. Further, the support arm 50 is spaced from the short leg 42 by a sufficient distance so that the check valve arm 24 will fit between the two (46, 50) during assembly.

Both the short leg 42 and the support arm 50 include screw holes receiving set screws 56, 58 extending toward the facing legs (long leg 44 for the short leg 42 and bottom leg 46 for the support arm 50). As illustrated in FIG. 3, the set screws 56, 58 may be screwed in (toward the facing legs 44, 46) so as to bias against the check valve arm 24 and at least frictionally secure the check valve arm 24 between each set screw 56, 58 and its facing leg 44, 46.

The legs 42, 44, 46 may advantageously have a configuration (their depth in FIG. 3, their width in FIG. 2) which matches the engaged check valve arm 24, in which case the engaged surfaces and frictional engagement may be maximized. Thus, when used to attach to a check valve arm which is, for example, cylindrical, the bottom leg may be a matching semi-cylindrical shape whereby the short, bottom and long legs would form a more classic "J" shape. Moreover, the set screws 56, 58 may be advantageously oriented at right angles as shown in FIG. 3, whereby the bracket 40 may be rigidly secured to the check valve arm 24 in all directions of possible motion. Suitable hex nuts 60, 62 or the like may be provided with each set screw 56, 58 to secure the set screws 56, 58 in place when they are suitably tightened against the check valve arm 24 to secure the bracket 40 thereon as described. It should be appreciated that this bracket 40 may be quickly, easily and reliable securely mounted on the check valve arm 24 such that the bracket 40 position will strictly follow the position of the check valve arm 24.

The support arm 50 also includes a connecting flange 70 which is oriented (when the bracket 40 is mounted to the check valve arm 24) in a generally vertical direction and includes a hole 72 which is cylindrical about an axis 74 extending substantially perpendicular to the connecting flange 70.

A mounting plate 78 is secured to the connecting flange 70 via a suitable pivot screw 80 and nut 82. As discussed in greater detail hereafter, the mounting plate 78 may be pivoted in a substantially vertical plane about the pivot screw 80 to a desired upright mounted orientation, after which it may be secured in that orientation by tightening of the pivot screw 80 and nut 82. Suitable lock washers 84 may also be provided to assist in maintaining the mounting plate 78 in the desired orientation even if bumped from time to time while mounted.

Rigidly secured to the mounting plate 78 is a switch box 86 which includes the tilt switch 30, a switch position indicator such as a light emitting diode (LED) 88, and a suitable wire connector as discussed in greater detail hereafter in connection with FIGS. 4 and 5a–c.

A wire connector 92 is also included with the switch box 86, which may be suitably connected with a wire plug 94. As illustrated diagrammatically in FIG. 3, the wire plug 94 may be connected by a suitable wire or cable 96 to a suitable pump controller 98 connected to a pump operation alarm 99, as also described in greater detail hereafter in connection with FIGS. 4 and 5a–c.

Referring now to FIGS. 4 and 5a–c, the wire connector 92 is illustrated diagrammatically as having 4-pins 100, 102, 104, 106. The LED 88 is connected in a circuit 110 connected to two of the pins 100, 102 and the tilt switch 30 is connected in a circuit 112 to the other two pins 104, 106.

The connector 92 is connectable to a selected wire plug 94 depending on the application. Three different wire plugs 94a, 94b, 94c are diagrammatically illustrated in FIGS. 5a, 5b, and 5c, respectively.

Figure 5A:
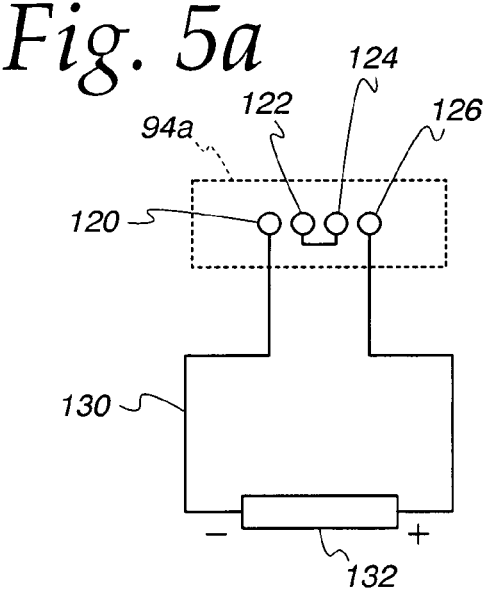
FIGS. 5a–5c are circuit diagrams of different plugs usable with the wire connector of FIG. 4.

The wire plug 94a illustrated in FIG. 5a may be used to create a battery circuit. That is, terminals 120 and 126 are connected to a circuit 130 with a battery 132 (e.g., a 3 volt battery), and terminals 122, 124 are connected together. Wire plug 94a may be connected to the connector 92 whereby pins 100, 102, 104, 106 connect to terminals 120, 122, 124, 126, respectively, thereby forming a single closed circuit in which the battery 132 provides power through the tilt switch 30 and the LED 88. It should therefore be appreciated that when the tilt switch 30 is oriented so as to be closed, the LED 88 visible right on the switch box 86 will be illuminated.

Figure 5B:
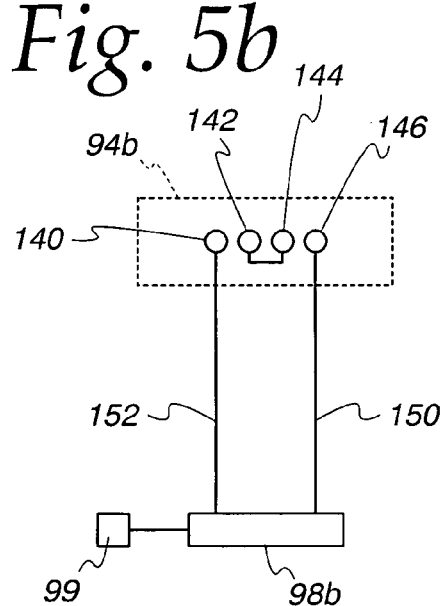

The PLC wire plug 94b illustrated in FIG. 5b is similar to that in FIG. 5a, except that the terminals 140, 142, 144, 146 when connected to the connector pins 100, 102, 104, 106 may form a closed circuit via wiring to the programmable control logic (PCL) of a controller 98b. Thus, with this wire plug 94b, a first wire 150 may be connected to the PCL, and a second wire 152 to ground. Since the PCL is typically low voltage, the LED 88 may be advantageously included in the circuit to continuously provide a switch position indication without being damaged.

Figure 5C:
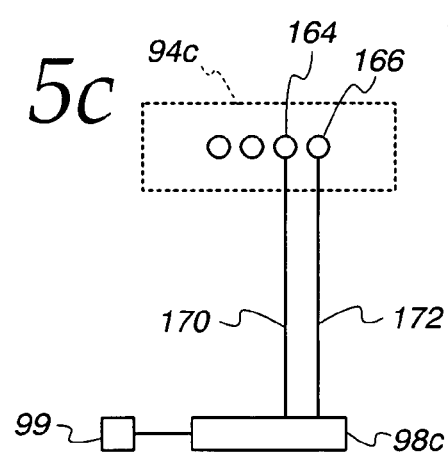

The relay logic wire plug 94c illustrated in FIG. 5c may be used with a controller 98c with a relay logic. In this case, only two terminals 164, 166 are used, with one connected to a wire 170 connected to ground and the other connected to a wire 172 connected to the relay logic. Since such a relay logic typically operates at 120 V, the LED 88 is not included in the circuit, as such voltage would damage the LED 88.

It should now be understood that the above wire plugs 94a–c can be selectively and advantageously used as follows.

The bracket 40 is first secured to a check valve arm 24 as previously described, whereby the connecting flange 70 is oriented in a generally vertical direction. The mounting plate 78 is loosely connected to the connecting flange 70 via the pivot screw 80 and nut 82 so that it can be pivoted around the axis 72.

With the check valve arm 24 in a position corresponding to the check valve 18 being closed, the mounting plate 78 is properly positioned as follows.

Either the battery plug 94a or the PLC plug 94b (if a PLC controller 98a is being used) is connected to the connector 92, thereby creating a powered circuit through both the LED 88 and the tilt switch 30 as previously described. The mounting plate 78 is then pivoted in the substantially vertical plane about the pivot screw 80 as previously described to a position in which the tilt switch 30 is closed, as will be indicated by the steady lighting of the LED 88. In that position, the pivot screw 80 and nut 82 are tightened whereby the mounting plate 78 will be securely held on the connecting flange 70 of the bracket 40.

If a PLC plug 94b was used, installation at that point will be complete. If a battery plug 94a was used, it may then be removed and connected to a suitable plug 94b, 94c connected to the appropriate controller 98b, 98c.

The controller 98b, 98c may then function normally to operate the pump 12. Whenever the pump 12 is operating normally, the check valve 18 will be open, causing the check valve arm 24 to pivot from the closed position (e.g., the horizontal position indicated in FIGS. 1–3). When the check valve arm 24 is pivoted from the closed position, the mounting plate 78 and tilt switch 30 connected thereto will also be pivoted to a different orientation, causing the tilt switch 30 to open. This will cause the circuit through the wiring to the programmable control logic (PCL) of controller 98b or to the relay logic controller 98c to open, which the controller 98b or 98c may be suitably programmed to recognize as an indication the pump 12 is not operating properly. In such a situation, the controller 98b or 98c may be further programmed to activate the alarm 99 to indicate improper operation of the pump 12. The alarm 99 may be any suitable indicator such as may draw the attention of a user to the detected pump condition, such as a bell, buzzer, light, generated message for a computer monitor, etc., depending on the pump station 10. Operation of the controller 98b or 98c could additionally be changed responsive to such a condition by, for example, shutting down power to the pump 12, activating backup pumps, etc.

It should be appreciated that the above described invention may also be advantageously used in other applications. For example, at pumping stations, detectors broadly incorporating the present invention may be used to detect when a cover of a well mounted pump station has been lifted (indicating possible unauthorized entry) or to actuate a blower responsive to detection of the lifting of an entrance lid to a below grade pump station, in addition to detecting pump failures as already described.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A position detector for a check valve having a check valve arm pivotable responsive to a change in position of the check valve, comprising:
   a bracket having
      a long leg generally parallel to a small leg, said long and small legs interconnected at their lower ends by a bottom leg, and
      a support arm extending from the upper end of the long leg, said support arm being spaced from said small leg and including a portion facing said bottom leg,
      wherein said check valve arm is receivable between said support arm and said bottom leg and between said long leg and said short leg;
   a first set member on one of said short leg and long leg, said first set member being adjustably movable toward the other of said short leg and long leg;
   a second set member on one of said bottom leg and said support arm, said second set member being adjustably movable toward the other of said bottom leg and support arm;
   a tilt switch;
   a connector adjustably connecting said tilt switch to said bracket support arm in a selected one of a plurality of secure positions pivoted around an axis fixed to said bracket support arm, said axis being oriented generally transverse to said long and short legs;
   a circuit status indicator;
   a wire connector for both said tilt switch and said circuit status indicator; and a plug kit selectively securable to said wire connector to form a selected circuit with said tilt switch and one of a controller and said circuit status indicator.

2. The position detector of claim 1, wherein said first plug includes a power source for said circuit.

3. The position detector of claim 2, wherein said power source is a battery.

4. The position detector of claim 1, wherein said plug kit includes a first plug adapted to include said circuit status indicator in said selected circuit and a second plug is adapted to include said controller in said selected circuit, wherein said controller operates responsive to the condition of the tilt switch.

5. The position detector of claim 1, wherein said circuit status indicator is a light emitting diode.

6. The position detector of claim 5, wherein said light emitting diode is integral with said tilt switch.

7. A position detector for a check valve having a check valve arm pivotable responsive to a change in position of the check valve, comprising:
   a bracket including a support arm;
   adjustable securing members adapted to rigidly secure said bracket to said check valve arm;
   a tilt switch;
   a connector adjustably connecting said tilt switch to said bracket support arm in a selected one of a plurality of secure positions pivoted around an axis fixed to said bracket support arm, said axis being oriented generally horizontally when said securing members secure said bracket to said check valve arm
   a circuit status indicator;
   a wire connector for both said tilt switch and said circuit status indicator; and
   a first plug selectively securable to said wire connector whereby a first circuit with said tilt switch and said circuit status indicator is formed when said tilt switch is in a selected position,
   a plug kit selectively securable to said wire connector whereby a selected circuit is formed with said tilt switch and one of a controller and said circuit status indicator.

8. The position detector of claim 7, wherein said plug kit includes a first plug adapted to include said circuit status indicator in said selected circuit and a second plug is adapted to include said controller in said selected circuit, wherein said controller operates responsive to the condition of the tilt switch.

9. The position detector of claim 8, wherein
   said tilt switch closes said second circuit when said check valve arm is in a position corresponding to said check valve being closed;
   said controller controls a pump adapted to pump through said valve; and
   said controller activates a pump operation alarm when operating said pump if said second circuit closes.

10. The position detector of claim 7, wherein said bracket has:
    a long leg generally parallel to a small leg, said long and small legs interconnected at their lower ends by a bottom leg; and
    said support arm extends from the upper end of the long leg, said support arm being spaced from said small leg and including a portion facing said bottom leg;
    wherein said check valve arm is receivable between said support arm and said bottom leg and between said long leg and said short leg.

11. The position detector of claim 7, wherein said securing members comprise:
    a first set member on one of said short leg and long leg, said first set member being adjustably movable toward the other of said short leg and long leg; and
    a second set member on one of said bottom leg and said support arm, said second set member being adjustably movable toward the other of said bottom leg and support arm.

12. The position detector of claim 7, wherein said first plug includes a power source for said circuit.

13. The method of claim 12, wherein said power source is a battery.

14. The position detector of claim 7, wherein said circuit status indicator is a light emitting diode.

15. The position detector of claim 14, wherein said light emitting diode is integral with said tilt switch.

16. A method of securing a position detector to a check valve arm pivotable responsive to a change in position of a check valve of a pump, comprising the steps of:
    securing a support bracket to said check valve arm, said support bracket supporting a tilt switch pivotable about a generally horizontal ads relative to said support bracket;
    providing a powered circuit through the tilt switch and a position indicator associated with the tilt switch;
    pivoting the tilt switch while the check valve arm is in a closed position until the position indicator is activated by the powered circuit;
    securing said tilt switch against pivoting relative to said support bracket; and
    providing a monitoring circuit through the tilt switch and a controller controlling the pump.

* * * * *

UNITED STATES PATENT AND TRADEMARK OFFICE
CERTIFICATE OF CORRECTION

PATENT NO. : 7,108,010 B2 Page 1 of 1
APPLICATION NO. : 10/670732
DATED : September 19, 2006
INVENTOR(S) : Fred Trentadue It is certified that error appears in the above-identified patent and that said Letters Patent is hereby corrected as shown below:

Column 7, line 30, should read as follows:

bracket to said check valve arm;

Column 8, line 39, should read as follows:

a generally horizontal axis relative to said support

Signed and Sealed this

Fourteenth Day of August, 2007

JON W. DUDAS
*Director of the United States Patent and Trademark Office*